R. A. SMITH.
Brick-Yard Sheds.
No. 141,520.　　　　　　　　　　Patented August 5, 1873.
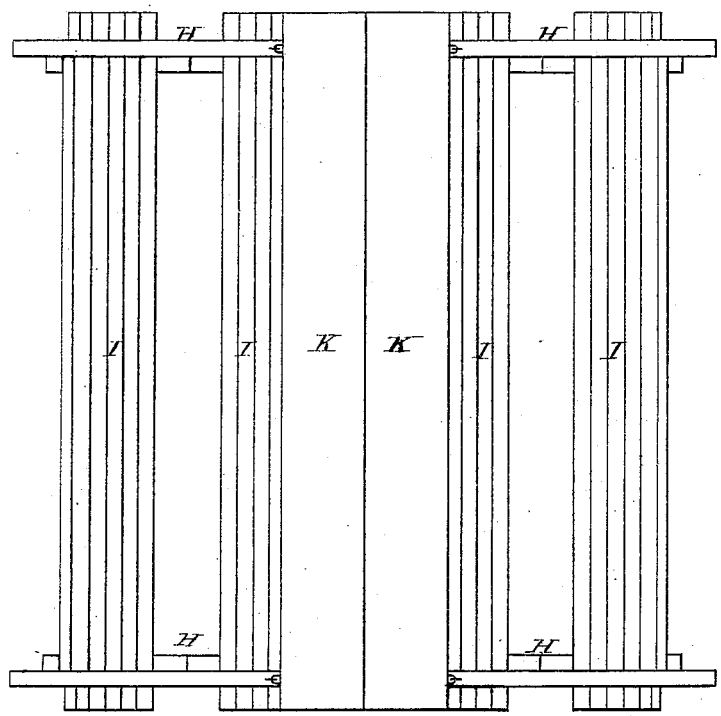
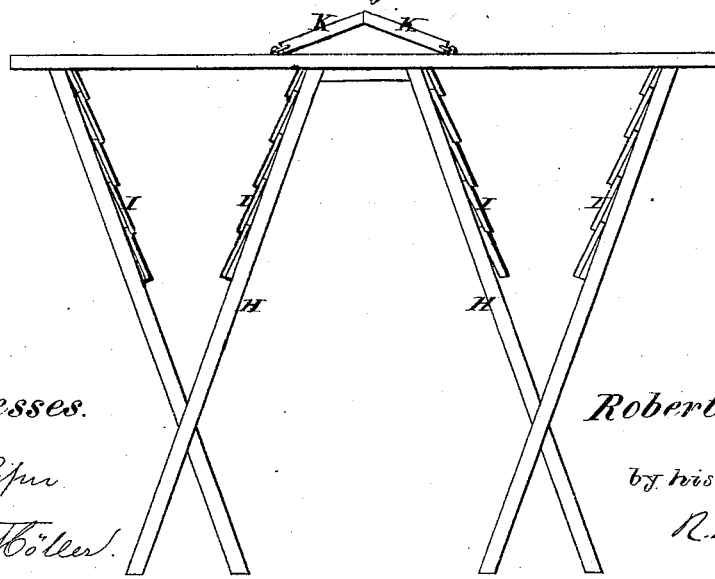
Witnesses.
Robert A. Smith,
by his attorney.

UNITED STATES PATENT OFFICE.

ROBERT A. SMITH, OF NEWBURYPORT, MASSACHUSETTS.

IMPROVEMENT IN BRICK-YARD SHEDS.

Specification forming part of Letters Patent No. 141,520, dated August 5, 1873; application filed June 25, 1873.

*To all whom it may concern:*

Be it known that I, ROBERT A. SMITH, of Newburyport, in the county of Essex and State of Massachusetts, have invented a new and useful Improvement in Sheds for Brick-Yards, such being for use for protecting from rain or snow stacks or piles of bricks while being dried; and I do hereby declare the same to be fully described in the following specification and represented in the accompanying drawings, of which—

Figure 1 is a top view, and Fig. 2 an end elevation, of one of the said sheds.

It is composed of two end frames, H H, constructed as shown in Fig. 2, and connected by means of clapboards I I I I and roof-doors K K, all arranged as shown in the drawings, there being to each pair of the clapboardings I I at their upper ends nearest together two of the said roof-doors, which are hinged to the end frames so as to be capable of being turned in a manner either to cover or uncover the space between the clapboardings.

The bricks to be dried are to be stacked underneath the clapboardings, and with spaces between the several stacks.

During stormy weather the doors K K may be closed, so as to prevent rain or snow from getting upon the bricks, such doors during pleasant weather being opened.

When such sheds are used they are to be placed side by side, and in such number as occasion may require.

I claim as my invention—

The protection-shed composed of the two frames H H, the clapboardings I, and the roof-doors K, constructed and arranged substantially as represented and described.

ROBERT A. SMITH.

Witnesses:
 R. H. EDDY,
 J. R. SNOW.